Patented Nov. 28, 1939

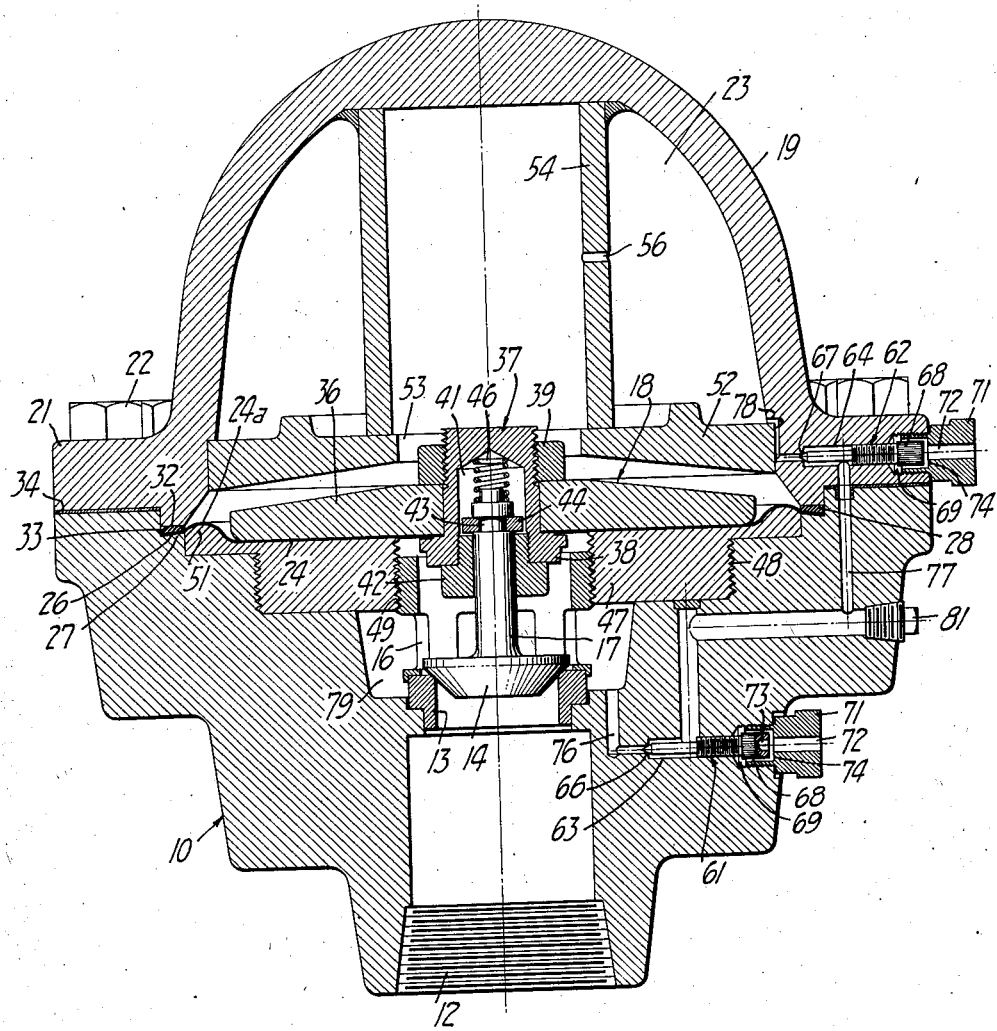
FIG_1_
INVENTOR.
Marvin H. Grove
BY Paul D. Flehr
ATTORNEY

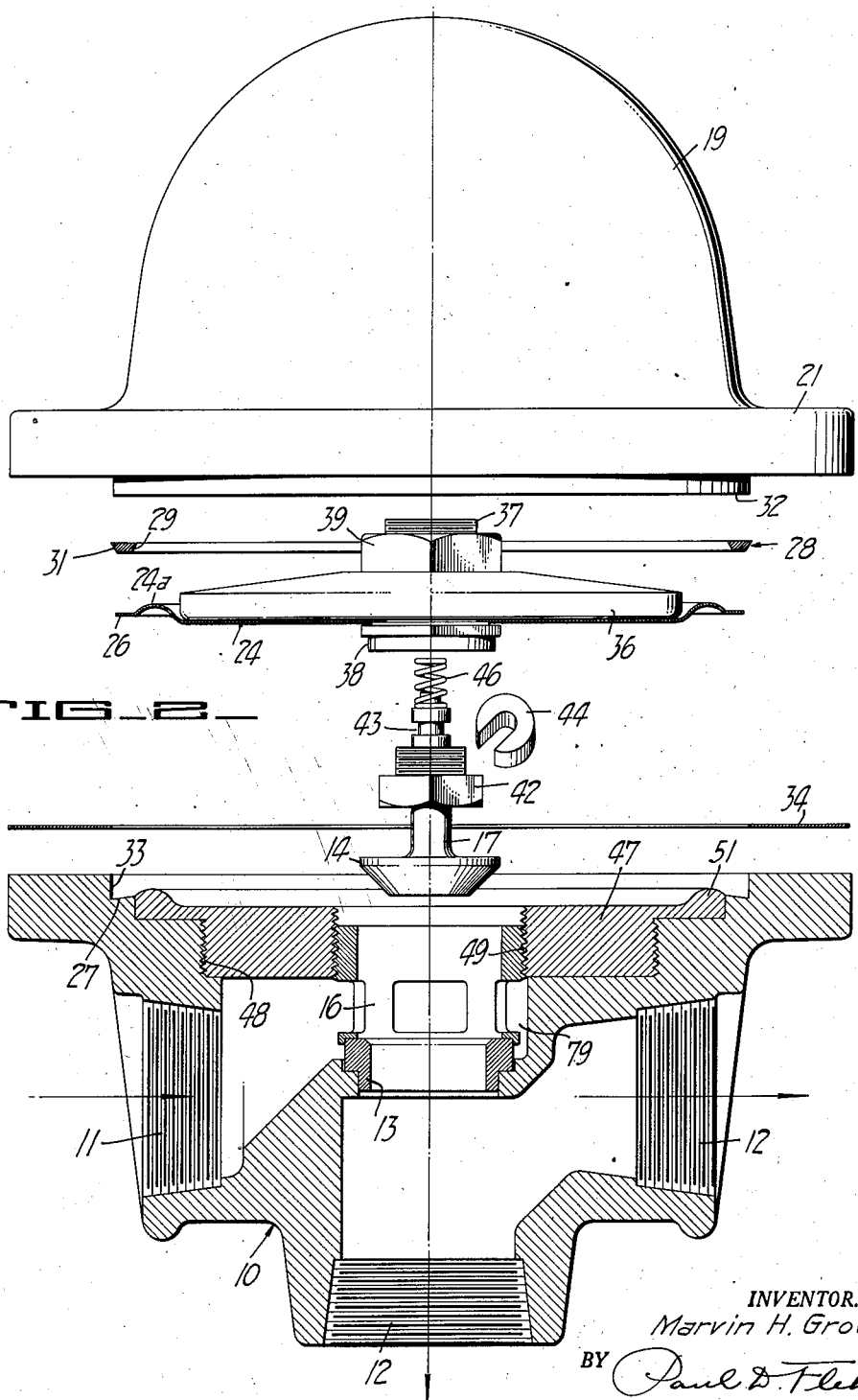

2,181,428

UNITED STATES PATENT OFFICE 2,181,428

FLOW REGULATOR

Marvin H. Grove, Berkeley, Calif.

Application July 27, 1936, Serial No. 92,707

2 Claims. (Cl. 137—53)

This invention relates generally to apparatus for controlling the flow of gases from a relatively high pressure source. It applies particularly to so-called back pressure regulators, which are utilized in instances which it is desired to maintain gas in a tank or receiver, at a pressure not to exceed a predetermined value.

It is an object of the invention to provide a flow control device of the above character, which will be simple in construction, but which will be simple in construction, but which will be positive and reliable in its operation.

Another object of the invention is to provide improved means for adjusting the pressure of compressed gas in the trapped loading chamber of a regulator, the improved means being characterized particularly by the use of simple needle valves requiring no particular packing.

Further objects of the invention will appear from the following description in which the preferred embodiment of the invention has been set forth in detail in conjunction with the accompanying drawings.

Referring to the drawings:
Fig. 1 is a side elevational view, in cross-section, illustrating a back flow regulator incorporating the present invention.

Fig. 2 is an exploded view separately illustrating the parts of the device shown in Fig. 1, and illustrating the manner in which these parts are assembled.

The particular embodiment of the invention illustrated in the drawings consists of a body 10, formed of suitable material such as forged steel, and provided with an inlet opening 11, and outlet openings 12. For controlling flow of gas through the body, valve means are provided, making use of a valve seat 13, and a cooperating valve member 14. The valve seat can be conveniently in the form of a ring which is fitted within the body, and which is held in position by means of a ported sleeve 16. Valve stem 17 is secured to the valve member 14, and this stem is operably connected with a fluid operated diaphragm assembly 18.

The majority of the flow control or flow regulated devices now available on the market, make use of a spring or weight for biasing a fluid pressure operated diaphragm or piston in one direction, and the flow regulating characteristics are adjusted by adjusting the value of such bias. With my device I prefer to eliminate the use of springs or weights, and to load or bias the diaphragm assembly 18 in one direction by trapped gas under pressure. Therefore as illustrated in the drawings the body 10 includes a dome 19. The flange 21 of this dome is securely clamped to the main body, by suitable means such as bolts or screws 22. The space on one side of the diaphragm assembly 18, enclosed by the dome 19, forms a trapped gas chamber 23, the gas pressure in which determines the degree of loading of the diaphragm assembly.

The diaphragm assembly illustrated consists of a diaphragm 24, formed of flexible sheet metal. The peripheral edge portion 26 of this diaphragm is seated upon an annular ledge 27, formed on the body 10. In order to effect an absolute seal between the diaphragm and the two portions of the body, a gasket 28 is provided, which is preferably formed of resilient material, such as resilient vulcanized rubber. It will be noted from Fig. 2 that before gasket 28 is compressed, it is formed with oppositely bevelled inner and outer side edges 29 and 31. When the dome 19 is assembled with the body 10, the gasket 28 is compressed between the peripheral edge portion 26 of the diaphragm, and the annular surface 32 provided on the dome. The resultant distortion of the gasket 28, not only forms an effective seal between the surface 32 and the peripheral edge portion 26 of the diaphragm, but also forms an effective seal with the adjacent annular surface 33, formed on the body. It will be noted in this connection that whereas surface 32 is substantially planar, surface 27 is slightly undercut, or in other words conforms to a section of a truncated cone. Such an arrangement serves to urge the outer peripheral portion of the gasket 28 against surface 33, to afford the desired gas-tight seal. If desired an additional gasket 34 can be inserted directly between the dome and the body.

The major area of the flexible diaphragm 24, is engaged by a rigid circular disc 36. Extending centrally through both the diaphragm 24 and the disc 36, there is a plug 37, the lower end of which is provided with an annular collar 38, to clamp upon the inner peripheral edge portion of the diaphragm, and thus establish an effective seal. The upper end of member 37 is threaded to receive a nut 39, whereby the assembly can be firmly clamped together.

With respect to the operating connection between the diaphragm assembly 18 and the valve member 14, it will be noted that the upper end of stem 17, extends into a bore 41, formed in member 37. The stem is slidably and loosely fitted within a ferrule 42, which in turn is threaded into the lower end of member 37. That portion of the stem 17 extending above the upper end of ferrule 42, is provided with an annular groove 43, to accommodate a slotted washer 44. The upper end of the valve stem is engaged by a compression spring 46, whereby the valve stem and the associated thrust washer 44, are normally urged downwardly with respect to the diaphragm assembly.

In order to limit downward flexing movement of the diaphragm assembly, a circular filler member 47 underlies the diaphragm 24, and is secured to the main part of the body 10, as by means of a threaded connection 48. This member also serves as a convenient mounting for the sleeve 16, and as illustrated, the sleeve has a threaded connection 49 to the same. It will be evident from Fig. 2 that sleeve 16 can be removed upwardly through member 47, in order to permit removal of the valve seat ring 13.

The diaphragm 24 should have sufficient flexibility to make possible the necessary opening and closing movements of the valve member 14, and at the same time must be of sufficient strength to withstand the pressures to which it may be subjected. In order to afford a proper degree of flexibility, the annular portion 24a of the diaphragm, extending between the periphery of member 18, and the peripheral edge portion 26, is corrugated as illustrated. Member 47 also has its upper face similarly contoured; in other words, it is formed to provide an annular ridge 51 which interfits in the corrugated diaphragm portion 24a, when the diaphragm assembly is in its lowermost position.

A rigid wall 52 is mounted near the lower part of the dome 19, and this wall extends over the diaphragm assembly 18, to limit upward flexing movement of the same. The central portion of wall 52 is shown provided with an opening 53, to accommodate nut 39, and is also shown bearing upon the lower end of a tubular reinforcing strut 54. The upper end of this strut can be attached to the dome, and its walls can be provided with one or more ducts 56, for passage of gas.

The valve means for adjusting the amount of gas in chamber 23, can be constructed as follows: Two needle valves 61 and 62 are provided, one being mounted in the main body 10, and the other in the flange 21 of the dome 19. Each of these needle valves is threaded into the respective bores 63 and 64, and their inner ends are adapted to seal upon the seats 66 and 67. The head 68 of each needle valve is accommodated in an enlarged counterbore 69, which in turn is threaded to receive a closure plug 71. Each closure plug 71 has a central opening 72, through which a plug wrench can be inserted, for engagement with a hexagonal socket 73, provided in the needle valve head 68. In turning a needle valve to open position, the annular end face of the head 68 is brought into engagement with the inner annular face 74 of the closure plug 71, to effect a seal to prevent escape of gas to the exterior.

When the needle valve 61 is opened, it establishes communication between ducts 76 and 77. When needle valve 62 is opened, it establishes communication between duct 77 and the chamber 23, through duct 78. Since duct 76 is in communication with space 79, on the inflow side of the regulator, it is evident that upon opening both the needle valves 61 and 62, gas from the high pressure inflow side of the regulator can be bled into the chamber 23, until a desired pressure within this chamber has been reached. Both the needle valves can then be closed, to afford an absolute seal. In the event it is desired to lower the gas pressure in chamber 23, an operator may open needle valve 62, while needle valve 61 is closed, and then permit gas to escape to the atmosphere, by loosening or removing plug 81.

Operation of the above device when used as a back pressure relief valve or regulator, can be described as follows: Assuming that it is desired to bleed gas from a pressure tank, when the gas pressure in the tank exceeds a predetermined value, the inflow opening 11 of the device is connected to the tank, while the outflow opening 12 can be directed to the atmosphere, or to a low pressure system. A sufficient amount of trapped gas is provided in chamber 23, to correspond in pressure to the pressure value which it is desired to maintain in the tank. Pressure on the inflow side of the device is applied upon the underside of the diaphragm assembly 18, so that if this pressure value is less than the pressure in chamber 23, the diaphragm assembly will be maintained in its lowermost position and valve member 14 will remain closed upon its seat 13, as shown in Fig. 1. In the event the inlet gas pressure rises above the value of gas pressure in chamber 23, the pressure on the underside of the diaphragm lifts the diaphragm assembly, thus causing valve member 14 to be moved to open position with respect to the seat 13, and permitting gas from the pressure tank to escape. Assuming that gas is being continuously supplied or pumped to the tank, valve member 14 will hunt between full open and closed position, to control the amount of gas permitted to escape, and thus maintain the gas pressure in the tank or receiver at a predetermined value. However, in the event the tank pressure falls below that of chamber 23, the diaphragm assembly 18 is again forced downwardly by the pressure of gas in chamber 23, to cause the valve member 14 to close upon its seat 13.

As previously explained there is a certain amount of lost motion in the connection between the valve stem 17, and the diaphragm assembly 18. In other words, from the position of the parts shown in Fig. 1, the diaphragm assembly 18 can be moved upwardly a small amount before picking up the valve member 14. Such lost motion is desirable in that it enables more positive closing of the valve member upon its seat, and in addition permits a certain amount of self-alignment of the valve member with respect to the seat, due to the fact that stem 17 is relatively loosely fitted within the ferrule 42.

In addition to the engagement between valve stem and ferrule 42, the valve member 14 is guided in its movements between open and closed positions, due to the fact that its outer diameter is only slightly less than the internal diameter of the ported sleeve 16. Thus although the valve member is adequately guided with respect to its seat, limited lateral movements of the stem 17 are permitted, within the limitations of the clearance between this stem and the ferrule 42, to promote a positive seal between the valve and its associated seat, when the diaphragm assembly 18 moves downwardly to its lowermost limit. There is no tendency for the valve member 14 to chatter with respect to the diaphragm assembly 18, due principally to the fact that the valve member opens against the gas pressure. Also the valve member does not chatter against its seat.

Even though the tank pressure being controlled is of relatively high value, the differential pressure to which the diaphragm 24 is subjected, is not of large value. However, in the event that the pressure below the diaphragm falls to a relatively low value, as for example atmospheric, the diaphragm will not be injured, because it seats upon the complementary contoured face of member 47.

Diaphragm assembly 18 can be positively seated upon member 47, because the lost motion between stem 17 and the diaphragm assembly, insures proper seating of the valve member 14, without too much force being placed upon the valve member to urge it against its seat.

Subject matter disclosed but not claimed herein is claimed in my co-pending application Serial No. 246,655, filed December 19, 1938, and entitled Back pressure regulator.

I claim:

1. In a flow regulator, a body having an inflow opening adapted to be connected to a source of gas under pressure and also having an outflow opening for discharge of gas, valve means within said body for controlling flow of gas through the same, a flexible diaphragm connected to effect actuation of said valve means, means forming a gas chamber on one side of said diaphragm adapted to contain a predetermined quantity of trapped gas under pressure, means forming a gas chamber upon the other side of said diaphragm adapted to be connected to a source of gas of variable pressure, and means including at least one manually operable valve for introducing additional gas under pressure into said first named chamber, said last means comprising a needle valve threaded into the body, whereby turning of said needle valve moves the same between open and closed positions, and means forming two valve seats for said needle valve member, one of said seats serving to seal the same in closed position, and the other of said seats serving to seal the same in open position.

2. In a flow regulator, a body having an inflow opening adapted to be connected to a source of gas under pressure and also having an outflow opening for discharge of gas, valve means mounted within said body for controlling flow of gas through the same, a flexible diaphragm connected to effect actuation of said valve means, means forming a gas chamber on one side of said diaphragm adapted to contain a predetermined amount of trapped gas under pressure, said last means consisting of a metal dome having flanges for clamping to the remainder of the valve body, means forming a gas chamber upon the other side of said diaphragm adapted to be connected to a source of gas of variable pressure, and means including at least one manually operable valve for introducing additional gas under pressure into said first named chamber or for permitting venting of gas from said first named chamber, said last means comprising a needle valve threaded into the body, whereby turning of said needle valve moves the same between open and closed positions, and means forming two valve seats for said needle valve member, one of said seats serving to seal the same in closed position, and the other of said seats serving to seal the same in full open position, the intermediate position of said valve member permitting leakage of gas from said first named chamber to reduce the pressure within the same.

MARVIN H. GROVE.